R. G. M. NOWELL.
Stench-Trap.
No. 202,860.        Patented April 23, 1878.
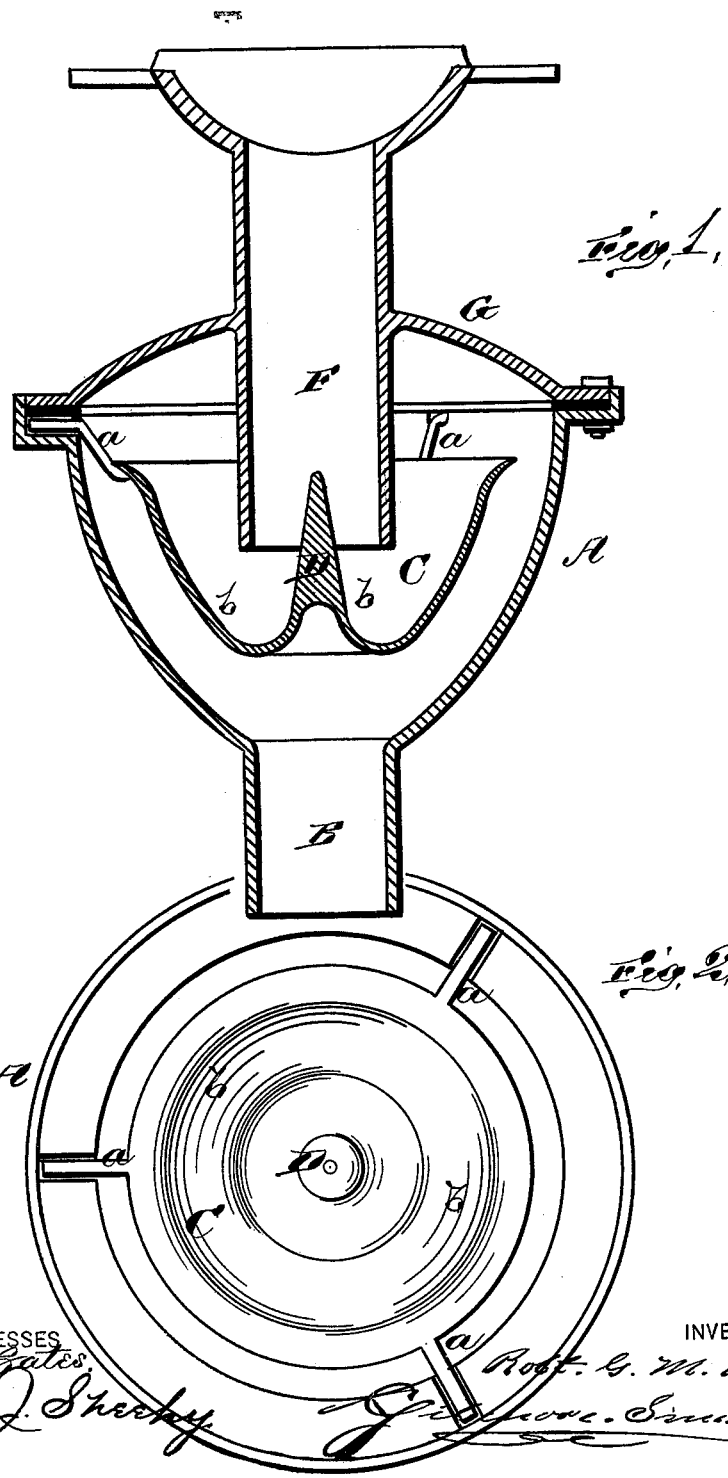

UNITED STATES PATENT OFFICE.

ROBERT G. M. NOWELL, OF COLUMBUS, OHIO.

IMPROVEMENT IN STENCH-TRAPS.

Specification forming part of Letters Patent No. 202,860, dated April 23, 1878; application filed March 30, 1878.

*To all whom it may concern:*

Be it known that I, ROBERT G. M. NOWELL, of Columbus, in the county of Franklin and State of Ohio, have invented a new and valuable Improvement in Stench-Traps; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical section of my stench-trap, and Fig. 2 is a plan view thereof.

The nature of my invention consists in the construction and arrangement of a stench-trap or sewer-trap, as will be hereinafter more fully set forth.

The annexed drawings, to which reference is made, fully illustrate my invention.

A represents the outside shell or casing, provided in the bottom with the outlet-pipe B, leading to the sewer. Within the shell or casing A is a bowl, C, suspended, by means of three arms, a a, from the top of the casing, said arms being placed in suitable notches or recesses made for their reception. In the center of the bowl is a conical projection, D, having concave sides, and uniting with the bowl by a gradual curve, as shown at b b. G is the cover of the trap, fastened to the top of the casing A by suitable bolts. In the center of this cover is cast the inlet-pipe F, which extends downward into the bowl C a suitable distance below the top of the conical projection D.

The water passing down through the pipe F will not come in a body into the bowl, which would make it liable to choke, but it will be divided by the cone D, so as to pass gently all around the lower end of the pipe F into the bowl, and over the curve b out over the edges of the bowl.

By this construction of the parts the trap becomes entirely self-cleaning, and will not choke up.

This trap may be used for any and all purposes where a stench-trap is needed.

What I claim as new, and desire to secure by Letters Patent, is—

1. In a stench-trap, the suspended bowl C, provided with projection D, forming a water-seal, in combination with the pipe F, arranged substantially as shown.

2. The combination, substantially as described, of the casing A, provided with outlet B at its lower end, the cover G, having inlet-pipe F, which extends downward within said cover, and the suspended bowl C, substantially as described, and for the purposes set forth.

In testimony that I claim the above I have hereunto subscribed my name in the presence of two witnesses.

ROBERT G. M. NOWELL.

Witnesses:
J. GILL BLAIN,
RASMUS TRÜS.